United States Patent [19]

Nomura et al.

[11] Patent Number: 4,544,819
[45] Date of Patent: Oct. 1, 1985

[54] WIRE-CUT, ELECTRIC DISCHARGE MACHINING METHOD

[75] Inventors: Yoshiyuki Nomura, Hachioji; Kanemasa Okuda, Hino; Hisao Ishii, Mitaka, all of Japan

[73] Assignee: Fanuc Ltd., Minamitsuru, Japan

[21] Appl. No.: 624,806

[22] Filed: Jun. 27, 1984

Related U.S. Application Data

[63] Continuation of Ser. No. 352,551, Feb. 26, 1982, abandoned.

[30] Foreign Application Priority Data

Mar. 2, 1981 [JP] Japan ................. 56-29731

[51] Int. Cl.⁴ .............................................. B23P 1/08
[52] U.S. Cl. ................. 219;69 W; 219/69 M
[58] Field of Search ............. 219/69 W, 69 M, 69 R, 219/68

[56] References Cited

U.S. PATENT DOCUMENTS 4,338,505 7/1982 Katsube et al. ................. 219/69 W
4,350,864 9/1982 Janicke et al. ................. 219/69 W

FOREIGN PATENT DOCUMENTS 0137835 10/1980 Japan .............................. 219/69 W Primary Examiner—M. H. Paschall
Attorney, Agent, or Firm—Staas & Halsey

[57] ABSTRACT

When cutting workpiece into a desired number of closed loop configurations by means of a wire-cut, electric discharge machine provided with an automatic wire feed mechanism, electric discharge machining is started from a machining start hole made in the workpiece corresponding to each closed loop configuration and is performed to a point where the electric discharge machining operation is stopped, thus a part of the closed loop configuration is left uncut. After fixing at least one portion of each closed loop configuration to the workpiece and inserting the wire electrode into the machining start hole by the automatic wire feed mechanism, the electric discharge machining operation is resumed to cut off the remaining uncut part. In the case of the wire electrode breaking during the electric discharge machining operation, the wire electrode is inserted by the automatic wire feed mechanism into the machining start hole and is moved to the position where it breaks along the route where the machining operation has already been performed, and then the electric discharge machining operation is resumed.

3 Claims, 5 Drawing Figures

WIRE-CUT, ELECTRIC DISCHARGE MACHINING METHOD

This application is a continuation of application Ser. No. 352,551, filed Feb. 26, 1982, now abandoned.

BACKGROUND OF THE INVENTION

1. Field of the Invention

The present invention relates to a wire-cut, electric discharge machining method for cutting a workpiece into one or more closed loop configurations such as a punch, die or the like through the use of a wire-cut, electric discharge machine provided with an automatic wire feed mechanism. More particularly, the invention pertains to a wire-cut, electric discharge machining method which permits further machining even in the case of a wire electrode being broken during machining, and which makes the machining operation less troublesome.

2. Description of the Prior Art

In recent years, a workpiece has often been cut into a closed loop configuration such as a punch, die or the like through the use of a wire-cut, electric discharge machine equipped with an automatic wire feed mechanism for automatically reinstalling a wire electrode on a running system.

FIG. 1 is explanatory of a conventional wire-cut, electric discharge machining method for cutting out a punch from a workpiece by the employment of the wire-cut, electric discharge machine provided with the automatic wire feed mechanism. In FIG. 1, reference numeral 1 indicates a workpiece; 2 designates a machining start hole; 3 identifies a of the workpiece left uncut; 4 denotes a portion of the punch; and 5 represents adhesive materials.

According to the prior art method, a wire electrode (not shown) is first inserted into the machining start hole 2 made in the workpiece 1, and electric discharge machining is performed along a route (A→B→C) and is stopped at the point C, leaving the part 3 uncut. The reason for leaving the part 3 uncut is to prevent the punch portion 4 from falling off the workpiece 1 and, avoiding breakage of the wire electrode. Next, the punch portion 4 is fixed to the workpiece 1 using the adhesive binder as indicated by 5 in FIG. 1 and then electric discharge machining is carried out along the broken-line route (C→B) to cut the part remaining uncut portion 3, obtaining a punch.

With the conventional method described above, if the wire electrode is broken in the course of electric discharge machining, the wire electrode is reinstalled on the running system and the machining operation is resumed in the manner described below.

In the event that the wire electrode is broken during electric discharge machining, the wire electrode and the workpiece 1 are moved relative to each other to the same positions as they were placed at the start of the machining operation and the wire electrode is inserted by the automatic wire feed mechanism into the machining start hole 2 for reinsallment on the running system. Next, the wire electrode and the workpiece 1 are moved relative to each other along the machining route where the electric discharge machining operation has already been conducted. After the wire electrode and the workpiece 1 have thus been brought to the same relative positions as when the wire electrode was broken, the electric discharge machining operation is restarted.

In the case where the wire electrode is broken during machining along the route (A→B→C), the machining operation can be automatically resumed by the abovesaid method, but in the case of breakage of the wire electrode during machining along the route (C→B), no further machining can be carried out. That is to say, since the punched portion 4 is fixed to the workpiece 1 as indicated by 5 in FIG. 1 before the machining operation along the route (B→C), the presence of the fixed portions 5 makes it impossible to move the wire electrode and the workpiece 1 relative to each other along the machining route where the electric discharge machining has already been effected. Problem can be avoided in the following manner. When the wire electrode has been brought to a position immediately before one of the fixed portions 5, the relative movement of the workpiece 1 and the wire electrode is stopped; the adhesive material is removed; the wire electrode and the workpiece 1 are moved relative to each other by a fixed distance; the punched portions is fixed again to the workpiece 1 using the adhesive binder; the wire electrode is brought to a position immediately before the other fixed portion 5; and the abovesaid operations are repeated. This is, however, very time-consuming and troublesome.

FIG. 2 is explanatory of cutting a workpiece into a plurality of punches by the conventional wire-cut, electric discharge machining method using the wire-cut, electric discharge machine provided with the automatic wire feed mechanism. In FIG. 2, reference numeral 6 indicates a workpiece; 7, 9 and 11 designate machining start holes; 8, 10 and 12 identify parts remaining uncut; 13 to 15 denote punch portions; and, 16a to 16f represent adhesive materials.

At first, a wire electrode (not shown) is inserted into the machining start hole 7 and electric discharge machining is performed along the route (A→B→C) and, at the point C, the machining operation is stopped, leaving the part 8 uncut. Next, the punch portion 13 is fixed to the workpiece 6 using the adhesive material as indicated by 16a and 16b and then electric discharge machining is carried out along the broken-line route (C→B), thus cutting out the punch portion 13 from the workpiece 6.

After cutting out the punched portion 13 from the workpiece 6, the wire electrode is inserted by the automatic wire feed mechanism into the machining start hole 9 and, as described above, electric discharge machining is effected along the route (D→E→F); the part 10 is left uncut; the punched portion 14 is fixed to the workpiece 6 using the adhesive material as indicated by 16c and 16d; and then electric discharge machining takes place along the broken-line route (F→E), cutting out the punch portion 14 from the workpiece 6. The punch portion 15 is also cut out in the same manner as described above.

As described above, according to the prior art method, the punch portions are cut out from the workpiece 6 one by one; hence, this method is very troublesome in that the punch portions 13 to 15 have to be fixed to the workpiece 6 after electric discharge machining along the routes (A→B→C), (D→E→F) and (G→H→I), respectively. Moreover, if the wire electrode is broken during cutting off the parts left uncut 8, 10 and 12, no further machining can be effected as described previously.

SUMMARY OF THE INVENTION

It is therefore an object of the present invention to provide a wire-cut, electric discharge machining method which permits automatic resumption of wire-cut, electric discharge machining even if the wire electrode is broken during electric discharge machining.

Another object of the present invention is to provide a wire-cut, electric discharge machining method which is less troublesome than the prior art method.

Briefly stated, according to the present invention, when a workpiece is to be cut into a desired number of closed loop configurations through the use of a wire-cut, electric discharge machine provided with an automatic wire feed mechanism, machining is started from a machining start hole made in the workpiece corresponding to each closed loop configuration and is performed along the closed loop configuration to a point of suspension of the machining operation, leaving a part uncut. After completion of the abovesaid machining operation for all the closed loop configurations, they are fixed at one part thereof to the workpiece and the wire electrode is inserted by the automatic wire feed mechanism into the machining start hole of each closed loop configuration and then electric discharge machining is, carried out through the aforesaid point of suspension of the machining operation, thus cutting off the remaining uncut part left uncut. Furthermore, in the case where the wire electrode is broken during electric discharge machining, the wire electrode is inserted into the machining start hole and is brought to the position of its breakage along the route where the machining operation has already been effected, and then the electric discharge machining operation is resumed.

DESCRIPTION OF THE PREFERRED EMBODIMENTS

Figure 1:
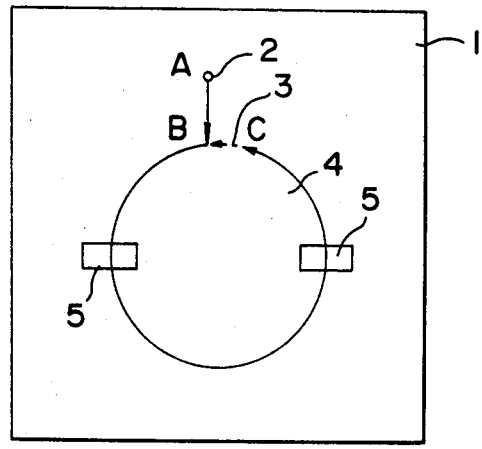
FIGS. 1 and 2 are explanatory of the conventional wire-cut, electric discharge machining method.
Figure 2:
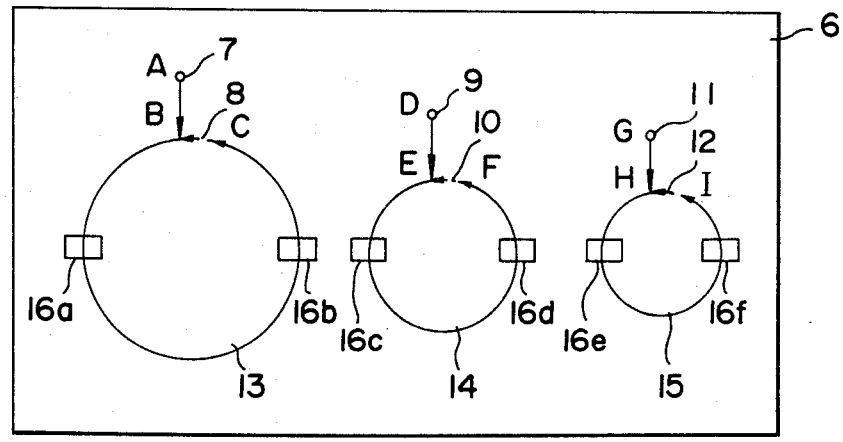
Figure 3:
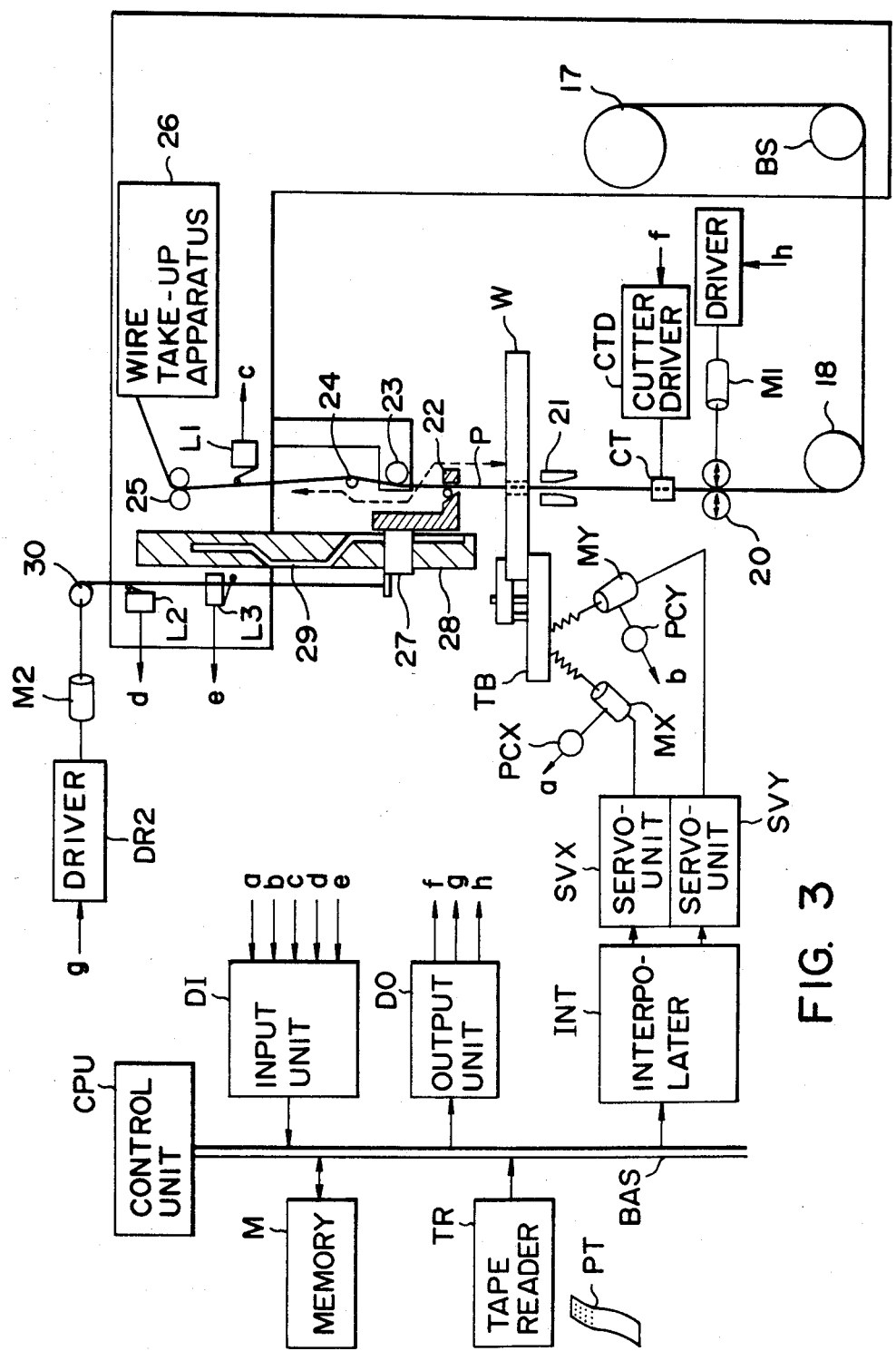
FIG. 3 schematically illustrates the arrangement of a wire-cut, electric discharge machine for use with the method of the present invention.

FIG. 3 shematically illustrates the arrangement of a wire-cut electric discharge machine with an automatic wire feed mechanism which is employed for the machining method of the present invention. In FIG. 3, reference character P indicates a wire electrode; W designates a workpiece; TB identifies a table for supporting the workpiece W; MX, MY, M1 and M2 denote motors; PCX and PCY represent position detectors; CT shows a cutter for cutting the wire electrode P; CTD refers to a cutter driver; BS indicates a brake shoe; L1 to L3 designate limit switches; CPU identifies a control unit; M denotes a memory; BAS represents a bus; DI shows an input unit; DO refers to an output unit; TR indicates a tape reader; PT designates a command tape; INT identifies an interpolator; SVX and SVY denote servo units; and, DR1 and DR2 represent drivers. Reference numeral 17 indicates a wire supply reel; 18 designates a guide roller; 20 identifies a wire feed mechanism; 21 denotes a nozzle; 22 represents a wire gripper; 23 shows an upper guide; 24 refers to a feed pin; 25 indicates feed rollers; 26 designates a wire take-up apparatus; 27 identifies a slide member which is slidable along a groove 29 cut in a shaft 28; and, 30 denotes a reel.

Figure 4:
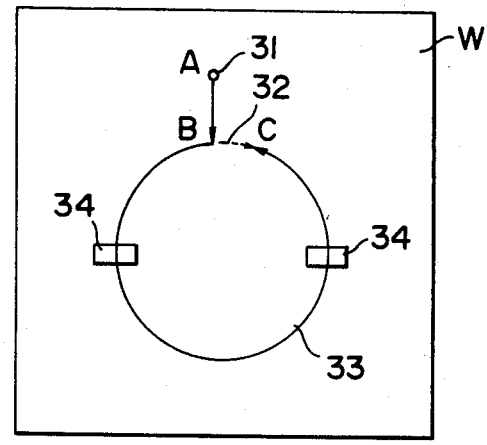
FIGS. 4 and 5 are explanatory of the method of the present invention.

FIG. 4 is explanatory of the machining method of the present invention, illustrating the case of cutting out a punch from the workpiece W. In FIG. 4, reference numeral 31 indicates a machining start hole; 32 designates a part remaining uncut; 33 identifies a punch portion; and 34 denotes adhesive materials.

The machining operation starts with passing the wire electrode P through the machining start hole 31 made in the workpiece W, then installing the wire electrode P on the running system as shown in FIG. 3, followed by the reading of the command tape PT by the tape reader TR to start machining. The control unit CPU sequentially reads out a machining route (A→B→C) stored on the command tape PT, performs wire diameter compensation and other necessary processing and then applies the results of the processing to the interpolater INT. The interpolater INT, responding to the information from the control unit CPU, conducts pulse distribution, providing output pulse signals to the servo units SVX and SVY. As a consequence, the motors MX and MY are driven to feed the table TB with the workpiece W mounted thereon, performing electric discharge machining along the route (A→B→C). Upon completion of the electric discharge machining along the route (A→B→C), the punch portion 33 is fixed by the operator to the workpiece W using the adhesive binder as indicated by 34 in FIG. 4.

Next, the control unit CPU applies a control signal f, produced based on a command stored on the command tape PT, to the cutter driver CTD via the output unit DO to activate the cutter CT, cutting off the wire electrode P. Then the control unit CPU supplies the interpolater INT with information on the distance of movement of the table TB for alignment of the top end portion of the nozzle 21 with the machining start hole 31. As a result of this, the motors MX and MY are driven to move the table TB as required. Incidentally, the control unit CPU detects the current position of the table TB on the basis of signals a and b which are applied via the input unit DI from the position detectors PCX and PCY.

Having detected the alignment of the open end portion of the nozzle 21 with the machining start hole 31, the control unit CPU provides a control signal g via the output unit DO to the driver DR2, operating the motor M2. By this, the reel 30 is driven at let out a cord retained at one end to the reel 30 and at the other end at the slide member 27, permitting the slide member 27 and the wire gripper 22 fixed thereto to go down along the groove 29 cut in the shaft 28, as indicated by the broken-line arrow. When the wire gripper 22 has reached the upper surface of the workpiece W, the abovesaid cord becomes loose to turn OFF the limit switch L2 and its output signal d becomes "0". In consequence, the control unit CPU stops the motor M2 from operation and, at the same time, applies a control signal h via the output unit DO to the driver DR1 to drive the motor M1, thereby activating the wire feed mechanism 20 to feed to wire electrode P upwardly. The wire feed mechanism 20 is so arranged as to grip the wire electrode P only when the motor M1 is in operation. When the wire electrode P has been fed to the wire gripper 22 through the nozzle 21 and the machining start hole 31, the control unit CPU stops the motor M1. The wire gripper 22 is to grip the wire electrode P fed thereto through the nozzle 21 and the machining start hole 31.

Next, the control unit CPU provides the control signal g via the output unit DO to the driver DR2 to drive the motor M2 in the reverse direction, by which the slide member 27 and the wire gripper 22 move up along the groove 29 as indicated by the broken-line arrow. Upon completion of the upward movement of the wire gripper 22 and the slide member 27, the limit switch L3 is turned ON and its output signal e becomes "1". Then the control unit CPU applies the control signal g via the output unit DO to the driver DR2 to stop the motor M2. At this time, the upper end of the wire electrode P has been pulled up to a position where it is gripped between the feed rollers 25 and the wire electrode P is fed by the rotation of the feed rollers 25. Thereafter the control unit CPU supplies the control signal g to the driver DR2, returning the wire gripper 22 and the slide member 27 to the illustrated positions.

Next, the control unit CPU sequentially reads the machining route (A→B) stored on the command tape PT, performs arithmetic processing and applies the result of the processing to the interpolater INT to operate the motors MX and MY so that the wire electrode P is brought to the point B where wire-cut, electric discharge machining starts. Upon arrival of the wire electrode P at the point B, the control unit CPU sequentially reads a program of the broken-line route (B→C) stored on the command tape PT, carries out wire diameter compensation and other necessary processing, applies the resultes of the processing to the interpolater INT and, at the same time, provides a control signal to a power source unit (not shown), resuming the electric discharge machining operation. Thus, in the same manner as described previously, the table TB having mounted theron the workpiece W is fed to conduct electric discharge machining along the route (B→C), cutting out the punched portion 33 from the workpiece W.

Next, a description is given of the operation in the event that the wire electrode P breaks during the electric discharge machining.

Upon breakage of the wire electrode P in the course of electric discharge machining, the limit switch L1 is turned OFF and its output signal c becomes "0". When the signal c applied to the control unit CPU via the input unit DI has becomes "0", the control unit CPU decides that the wire electrode P has broke, and stores information on the current position of the table TB in the memory M and, further, provides a control signal to the interpolater INT, stopping the motors MX and MY. Then the distance of movement of the table TB, which is necessary for alignment of the open end portion of the nozzle 21 with the machining start hole 31, is obtained from the information on the current position of the table TB and the information on the position of the machining start hole 31, both stored in the memory M. The information thus obtained is provided to the interpolater INT to drive the motors MX and MY, thereby feeding the table TB as required. Having detected the alignment of the nozzle 21 with the machining start hole 31 from the signals a and b which are supplied via the input unit DI, the control unit CPU applies the control signals h and g to the drivers DR1 and DR2, respectively, reinstalling the wire electrode P on the running system in the same manner as described previously.

Following the reinstallment bf the wire electrode P on the running system, the control unit CPU performs either one of the following two control operations depending upon whether the breakage of the wire electrode P has been detected during the electric discharge machining along the solid-line route (A→B→C) or the broken-line route (B→C).

In the case where the breakage of the wire electrode P is detected during the electric discharge machining along the solid-line route (A→B→C), the wire electrode P is passed through the machining start hole 31, the table TB is fed so that the wire electrode P is moved along the route where the electric discharge machining has already been completed, and the electric discharge machining is started again when the wire electrode P reaches the position where it broke.

In the event that the breakage of the wire electrode P is detected during the electric discharge machining along the broken-line route (B→C), the wire electrode P is passed through the machining start hole 31, the table TB is fed in a manner to move the wire electrode P along the route (A→B) and then the table TB is further fed to move the wire electrode P along the broken-line route (B→C) to the position where it broke. Thereafter the electric discharge machining is resumed.

Accordingly, even if the wire electrode P is broken while performing the electric discharge machining along the broken-line route (B→C) for cutting off the uncut part 32, there are no possibilities of the fixed parts 34 hindering further machining unlike in the prior art.

Figure 5:
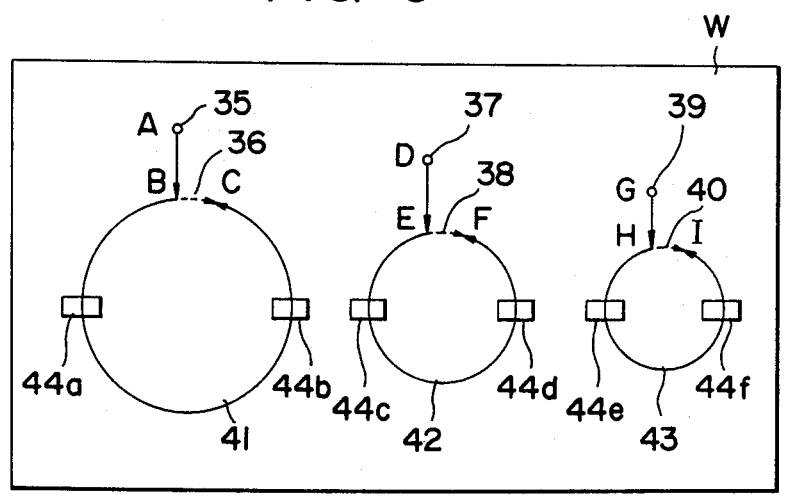

FIG. 5 is explanatory of the operation for cutting out a plurality of punches from the workpiece W according to the method of this invention. In FIG. 5, reference numerals 35, 37 and 39 indicate machining start holes; 36, 38 and 40 designate parts remaining uncut; 41 to 43 identify punch portions; and 44a to 44f denote fixed parts. Also in this case, the wire-cut, electric discharge machine shown in FIG. 3 is employed.

At first, the wire electrode P is passed through the machining start hole 35, electric discharge machining is carried out along the solid-line route (A→B→C) and, at the point C, the electric discharge machining is stopped leaving the portion 36 uncut. Upon completion of the electric discharge machining to the point C, the control unit CPU, as described previously, controls the cutter CT and the motors M1, M2, MX and MY to pass the wire electrode P through the machining start hole 37 and perform electric discharge machining along the solid-line route (D→E→F), leaving the portion 38 uncut. After the finish of the electric discharge machining to the point F, the control unit CPU controls the respective parts to pass the wire electrode P through the machining start hole 39 and perform electric discharge machining along the solid-line route (G→H→I), leaving the portion 40 uncut.

Upon completion of the electric discharge machining along the the solid-line route (G→H→I), the control unit CPU stops the electric discharge machining. Then, the operator fixes the punch portions 41 to 43 to the workpiece W using the adhesive binder as indicated by 44a to 44f. By fixing all the punch portions 41 to 43 to the workpiece W at one time in this way, the operation can be made less troublesome.

After fixing the punch portions 41 to 43 to the workpiece W, the operator enters a machining restart command to the control unit CPU via the input unit DI, for instance. The control unit CPU controls the cutter CT and the motors M1, M2, MX and MY to pass the wire electrode P through the machining start hole 35 and feed the table TB so that the electrode P may move along the route (A→B). When the wire electrode P has reached the point B, electric discharge machining takes place along the broken-line route (B→C) to cut off the uncut part 36, thus finishing the cutting of the punch portion 41. Thereafter, the punched portions 42 and 43 are cut out in the same manner as in the case of cutting out the punch portion 41.

In the case of breakage of the wire electrode P during electric discharge machining, the machining operation is resumed in the manner described below.

In the event that the wire electrode P breaks during electric discharge machining along the solid-line route (A→B→C), (D→E→F) or (G→H→I), the wire electrode P is passed through the machining start hole 35, 37 or 39 and the table TB is fed so that the wire electrode P moves to the position of its breakage along the machining route where the electric discharge has already been effected, thereafter resuming the electric discharge machining operation. When the wire electrode P breaks while in the electric discharge machining operation along the broken-line route (B→C), (E→F) or (H→I) for cutting off the parts 36, 38 or 40, the wire electrode P is passed through the machining start hole 35, 37 or 39 and the table TB is fed so that the wire electrode P moves along the route (A→B), (D→E) or (G→H) and then the table TB is fed so that the wire electrode P moves along the broken-line route (B→C), (E→F) or (H→I) to the position where it broke. Consequently, even if the wire electrode P is broken while cutting off the uncut parts 36, 38 or 40, further machining can be performed as described previously.

As has been described in the foregoing, according to the present invention, the wire electrode, when broken, is passed through the machining start hole by means of the automatic wire feed mechanism and is moved to the position of its breakage along the machining route where electric discharge machining has already been carried out and then the electric discharge machining operation is restarted; therefore, even if the wire electrode is broken in the course of cutting off the remaining uncut part, the machining operation can automatically be resumed. Moreover, according to the present invention, the part remaining uncut is formed for each of the closed loop configuration to be cut out of the workpiece and then the closed loop configurations are all fixed to the workpiece at one time; accordingly, the machining operation is simplified.

It will be apparent that many modifications and variations may be effected without departing from the scope of the novel concepts of this invention.

What is claimed is:

1. An automatic wire-cut, electric discharge machining method for cutting a workpiece having at least one machining start hole into a desired number of closed loop configurations by means of a wire-cut, electric discharge machine provided with an automatic wire feed mechanism for automatically installing a wire electrode on a wire electrode running system through the machining start hole, the method comprising the steps of:
    (a) starting automatic electric discharge machining from a machining start hole corresponding to the closed loop configuration to be wire-cut;
    (b) performing the electric discharge machining in a first direction and along the closed loop configuration to a point of suspension of the electric discharge machining operation where a part of the closed loop configuration is left uncut, such that if the wire electrode breaks while machining along the first direction, the wire electrode is automatically reinserted in the start hole and machining automatically continues along the first direction until said point of suspension is reached;
    (c) removing the wire electrode from the workpiece;
    (d) fixing at least one portion of the machined closed loop configuration to the workpiece;
    (e) inserting the wire electrode into the machining start hole by the automatic wire feed mechanism; and
    (f) performing automatic electric discharge machining in a second direction to cut off the part left uncut, such that if the wire electrode breaks while machining along the second direction, the wire electrode is automatically reinserted in the start hole and machining automatically continues along the second direction.

2. A wire-cut, electric discharge machining method according to claim 1, wherein step (b) further includes: performing said electric discharge machining along a closed loop configuration to a point where said wire electrode breaks; inserting the wire electrode into the machining start hole by the automatic wire feed mechanism;
    positioning the wire electrode along said machine closed loop configuration to the point where said wire electrode broke, and
    continuing the electric discharge machining along the closed loop configuration to said point of suspension.

3. A wire-cut, electric discharge machining method according to claim 1, wherein step (f) further includes: performing said electric discharge machining to a point where said wire electrode breaks before completing machining of the closed loop configuration;
    inserting the wire electrode into the machining starting hole by the automatic wire feed mechanism;
    performing electric discharge machining along the part of the closed loop configuration left uncut, to the point of suspension.

* * * * *

UNITED STATES PATENT AND TRADEMARK OFFICE
CERTIFICATE OF CORRECTION

PATENT NO.    : 4,544,819
DATED         : October 1, 1985
INVENTOR(S)   : NOMURA ET AL.

It is certified that error appears in the above-identified patent and that said Letters Patent is hereby corrected as shown below:

```
Column 2, line 16, "Problem" should be --This problem--;
          line 47, "punched" should be --punch--;
          line 52, "punched" should be --punch--.
Column 7, line 3,  "punched" should be --punch--.
```

Signed and Sealed this

Fourteenth Day of January 1986

[SEAL]

Attest:

Attesting Officer

DONALD J. QUIGG

Commissioner of Patents and Trademarks